Feb. 24, 1931. O. EISENHUT 1,794,004
PRODUCTION OF ACETYLENE AND HYDROGEN IN THE ELECTRIC ARC
Filed Aug. 19, 1929
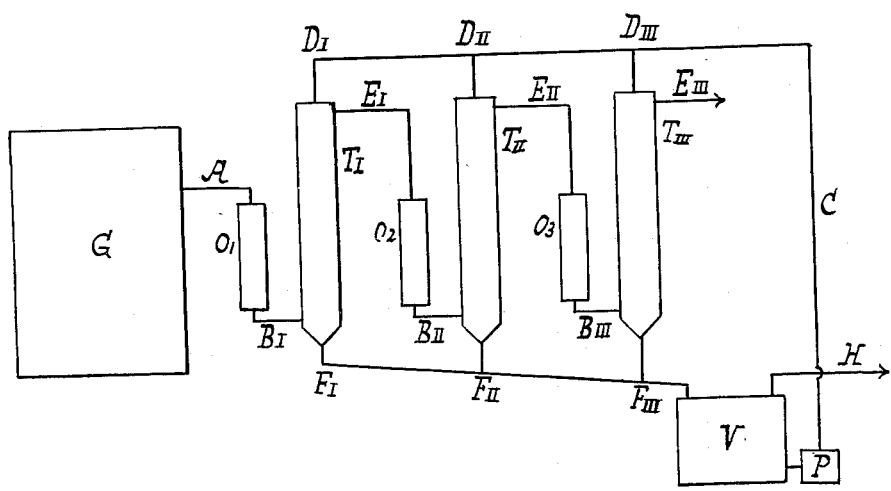
Inventor
Otto Eisenhut
By his Attorneys Hauff Sbarland Patented Feb. 24, 1931 1,794,004

UNITED STATES PATENT OFFICE

OTTO EISENHUT, OF HEIDELBERG, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF ACETYLENE AND HYDROGEN IN THE ELECTRIC ARC

Application filed August 19, 1929, Serial No. 387,053, and in Germany February 2, 1926.

This invention relates to improvements in the manufacture and production of acetylene and hydrogen in the electric arc.

It is already known that valuable unsaturated hydrocarbons, such as acetylene can be produced from saturated hydrocarbons, as for example methane by treating the gases with an electric arc.

I have now established the fact that the yield of acetylene for a given concentration of saturated hydrocarbons in the gas to be treated is dependent on the length and on the shape of the electric arc. When passing hydrocarbons in a disperse phase, such for example as a gas initially rich in methane, through several electric arcs one after another, the said fact may be exploited in an advantageous manner with the production of high yields by adapting the length and, if desired, also the shape of the electric arcs to the changing composition of the gas in such a manner that in each arc a maximum conversion is obtained. The acetylene which is formed may be removed after passage through one or several electric arcs. After leaving the last electric arc a residual gas is finally obtained which consists substantially of hydrogen and which contains at most about 1 per cent of saturated hydrocarbons, for example 1 per cent of methane.

This method of working is very valuable because practically the entire quantity of the hydrocarbons employed is converted into valuable unsaturated compounds and moreover a practically pure hydrogen is obtained. This hydrogen may be employed for hydrogenation processes or in part may be subjected again to the process hereinbefore described after the addition, for example of natural gas.

As examples of hydrocarbons in the disperse phase suitable for treatment according to the process of the present invention may be mentioned, gases and vapours consisting of or containing hydrocarbons, such as methane, ethane, natural gases, gases obtained by distillation of coal of all varieties, shale, peat or similar bituminous materials, cracking gases, oil or tar vapours. Further may be mentioned nebulized or otherwise finely divided carbonaceous materials, as for example nebulized tar or oils or coal dust. The initial materials employed according to the present invention may be referred to for the sake of brevity as hydrocarbons in the disperse phase. Non-hydrocarbon gases may also be present, such as hydrogen, which may in some cases be taken from the process itself, nitrogen, carbon monoxide or carbon dioxide. The latter three are preferably employed in small amounts although larger amounts thereof may of course also be employed. The employment of hydrogen tends to suppress an undesirable formation of carbon.

The process may be carried out under any pressures under which electric arcs can be obtained, that is to say at atmospheric pressure or at reduced pressures down to about 1/20 of an atmosphere and at an elevated pressure. Different pressures may for example also be employed for different arcs.

As a rule arcs having voltages ranging between 1 and 3 kilovolts are employed, but much higher voltages or lower voltages, as for example of 10 kilovolts or more or of down to about 500 volts or less. The energy of the arc furnaces may be up to 2000 kilowatts or even more.

The following examples will further illustrate the nature of this invention, but the invention is not restricted to these examples. Example 2 is with reference to the accompanying drawing.

*Example 1*

A gas mixture of 75 per cent of methane and 25 per cent of hydrogen is passed consecutively through three electric arcs having increasing lengths of arc (80, 100 and 120 millimetres) each with a power of 5 kilowatts. After passage through each arc the acetylene formed is absorbed by solvents, for example acetone, or by solid absorbents. As a result of each treatment from 7 to 9 per cent of acetylene besides other unsaturated hydrocarbons are obtained with an average energy yield of from 60 to 80 litres per kilowatt hour. The residual gas consists of hydrogen containing less than 1 per cent of methane. The ratio of the lengths of the arcs is 4:5:6.

Example 2

The drawing illustrates diagrammatically and in vertical section a plant for the production of acetylene according to the present invention.

G is a gas container. $O_1$, $O_2$ and $O_3$ are arc furnaces in which arcs of different length can be produced. A, $E_I$ and $E_{II}$ are pipe lines for introducing gas to the said arc furnaces. $T_I$, $T_{II}$ and $T_{III}$ are scrubbers. $D_I$, $D_{II}$ and $D_{III}$ are branch pipes for the introduction of solvents to the said scrubbers. $B_I$, $B_{II}$ and $B_{III}$ are pipe lines for the introduction of the gases issuing from the arc furnaces to the said scrubbers. $E_I$, $E_{II}$ and $E_{III}$ are pipes for the withdrawal of the scrubber gases from the scrubbers. $F_I$, $F_{II}$ and $F_{III}$ are branches for the withdrawal of the washing liquid from the scrubber. V is a container for the scrubbing liquid and H a pipe for the withdrawal of scrubbing liquid therefrom. P is a pump for pumping scrubbing liquid to the towers by way of the pipe C.

A preferred method of working with this said apparatus is described in the following. A gas containing hydrocarbons derived from the destructive hydrogenation of coal and having the composition: 63 per cent of hydrogen, 18 per cent of methane, 8 per cent of ethane, 4 per cent of propane, 2 per cent of butane and the remainder nitrogen and small amounts of unsaturated hydrocarbons contained in the container G is introduced by way of the pipe line A into the top of an upright electric arc furnace $O_I$ containing an electric arc of 200 millimetres in length. A gas mixture is obtained which contains 8 per cent of acetylene which is passed by way of the pipe $B_I$ to the bottom of a scrubber $T_I$. Cyclohexanone from the container V is introduced with the aid of the pump P and pipe C by means of the branch $D_I$, into the top of the said scrubber $T_I$. After removal of the acetylene by washing out with cyclohexanone, a gas containing about 72 per cent of hydrogen, 24 per cent of hydrocarbons and 4 per cent of nitrogen issues at the top of the said scrubber. This gas mixture is passed on through the pipe $E_I$ to a second arc furnace $O_2$ containing an arc of 280 millimetres in length. The gas mixture issuing from the said furnace which contains 8 per cent of acetylene is passed by way of the pipe $B_{II}$ into the scrubber $T_{II}$ into which cyclohexanone is introduced by way of the pipe $D_{II}$. A gas containing 14 per cent of methane and its homologues besides hydrogen and nitrogen issues from the scrubber $E_{II}$. This gas mixture may be converted in a third arc furnace $O_3$ containing an arc of 350 millimetres in length into a mixture containing 7 per cent of acetylene. This gas mixture is passed on by way of the pipe $B_{III}$ to the scrubber $T_{III}$ into which cyclohexanone is introduced at $D_{III}$. After removing the acetylene a gas mixture issues at $E_{III}$, which consists of 93 per cent of hydrogen, from 2 to 3 per cent of hydrocarbons and the remainder nitrogen, which may be employed directly for the hydrogenation of coal. The shape of the said arcs may also be modified to suit the individual conditions by the insertion of suitable insulating means. The ratio of the lengths of the arcs according to the said example is 2.8 : 4 : 5. These ratios are of course capable of wide variation.

I claim:—

1. A process for the production of acetylene and hydrogen, which comprises passing hydrocarbons in a disperse phase through several arcs one after another and adapting the length of the arcs to the changing composition of the gas in such a manner that in each arc a maximum conversion is obtained by increasing the length of each consecutive arc.

2. A process for the production of acetylene and hydrogen, which comprises passing a gas comprising methane through three arcs one after another, the lengths of which have a ratio of about 2.8 : 4 : 5 respectively.

3. An apparatus for the production of acetylene and hydrogen from hydrocarbons in the disperse phase, comprising several arc furnaces in series, means for the production of arcs therein, each having a length longer than that of the arc next before it and scrubbers interposed between any of the said arc furnaces and after the last arc furnace.

4. An apparatus for the production of acetylene and hydrogen from hydrocarbons in the disperse phase, comprising a container for initial gas, an arc furnace, a pipe connecting the said container with one end of said arc furnace, means in said furnace for producing an arc of given length, a scrubber, a pipe connecting the other end of the said furnace with one end of said scrubber, a second arc furnace, a pipe for passing gases from the other end of said scrubber to one end of said second electric arc furnace, means in said furnace for producing an arc of greater length than that which would be produced in the first furnace, a second scrubber, a pipe for passing gases from the other end of said second furnace to one end of said second scrubber, a third arc furnace, a pipe for passing gases from the other end of said second scrubber to one end of said third electric arc furnace, means in said furnace for producing an arc of greater length than that which would be produced in the second furnace, and a pipe for withdrawing gases from the other end of the said third furnace.

In testimony whereof I have hereunto set my hand.

OTTO EISENHUT.